(12) United States Patent
Robinson et al.

(10) Patent No.: US 11,151,591 B2
(45) Date of Patent: Oct. 19, 2021

(54) DYNAMIC SCAN CODE GENERATION

(71) Applicant: Yahoo!, Inc., Sunnyvale, CA (US)

(72) Inventors: David Scott Robinson, Palo Alto, CA (US); Aaron Robert Martin, Redwood City, CA (US)

(73) Assignee: VERIZON MEDIA INC., New York, NY (US)

( * ) Notice: Subject to any disclaimer, the term of this patent is extended or adjusted under 35 U.S.C. 154(b) by 423 days.

(21) Appl. No.: 15/370,363

(22) Filed: Dec. 6, 2016

(65) Prior Publication Data

US 2018/0158087 A1 Jun. 7, 2018

(51) Int. Cl.
*G06Q 30/02* (2012.01)
*G06Q 20/32* (2012.01)

(52) U.S. Cl.
CPC ..... G06Q 30/0207 (2013.01); G06Q 20/3274 (2013.01)

(58) Field of Classification Search
None
See application file for complete search history.

(56) References Cited

U.S. PATENT DOCUMENTS

| 7,308,254 | B1 * | 12/2007 | Rissanen | G06Q 20/327 455/414.1 |
| 10,079,826 | B2 * | 9/2018 | Hamid | H04L 63/083 |
| 2004/0117250 | A1 * | 6/2004 | Lubow | G06Q 20/342 705/14.17 |
| 2009/0061901 | A1 * | 3/2009 | Arrasvuori | G06Q 30/00 455/456.3 |

(Continued)

FOREIGN PATENT DOCUMENTS

KR 20140007707 A * 1/2014

OTHER PUBLICATIONS

Pradipta De, Kuntal Dey, Vinod Mankar, and Sougata Mukherjea. 2015. An Assessment of QR Code as a User Interface Enabler for Mobile Payment Apps on Smartphones. In Proceedings of the 7th International Conference on HCI, IndiaHCI 2015 (IndiaHCI'15). Association for Computing Machinery, New York, NY (Year: 2015) USA, 81-84. DOI:https://doi.org/10.1145/2835966.2835977 (Year: 2015).*

(Continued)

*Primary Examiner* — Kambiz Abdi
*Assistant Examiner* — Scott Snider
(74) *Attorney, Agent, or Firm* — Cooper Legal Group LLC

(57) ABSTRACT

One or more computing devices, systems, and/or methods for dynamic scan code generation are provided. For example, a meta tag, comprising a user identifier of a user and a promotion code for a consumer good, is extracted from information associated with the user, such as from an email sent to the user. When a current location of a computing device of the user is within a threshold distance of a consumer good location that sells the consumer good, a scan code is dynamically generated based upon the user identifier and the promotion code. A notification of the promotion code, a description of the consumer good location, and/or other information is provided to the user such as through a push notification. The scan code is displayed through the computing device for applying the promotion code to a purchase from the consumer good location for the consumer good.

20 Claims, 9 Drawing Sheets

(56) References Cited

U.S. PATENT DOCUMENTS

| | | | |
|---|---|---|---|
| 2009/0288012 A1* | 11/2009 | Hertel | G06Q 20/326 715/738 |
| 2010/0250351 A1* | 9/2010 | Gillenson | G06Q 30/02 705/14.13 |
| 2012/0185317 A1* | 7/2012 | Wong | G06Q 30/0222 705/14.23 |
| 2012/0209749 A1* | 8/2012 | Hammad | G06Q 20/3674 705/27.1 |
| 2013/0211890 A1* | 8/2013 | Heitmueller | G06Q 30/0207 705/14.13 |
| 2014/0108123 A1* | 4/2014 | Russell | G06Q 30/0238 705/14.38 |
| 2014/0337138 A1* | 11/2014 | Chitalia | G06Q 20/20 705/14.64 |
| 2015/0127478 A1* | 5/2015 | Westby | G06Q 10/087 705/26.1 |
| 2015/0278805 A1* | 10/2015 | Spencer, III | G06Q 20/3278 705/44 |
| 2015/0339696 A1* | 11/2015 | Zhou | G06Q 20/387 705/14.23 |
| 2016/0098755 A1* | 4/2016 | Silvestro | G06Q 30/0258 705/14.56 |
| 2017/0228760 A1* | 8/2017 | Mason-Gugenheim | G06Q 20/387 |
| 2018/0365463 A1* | 12/2018 | Akdeniz | G06K 19/06037 |

OTHER PUBLICATIONS

L. S. Khedekar and P. S. Kale, "Strength of QR code over design and implementation of authentication system," 2016 International Conference on Communication and Signal Processing (ICCSP), 2016, pp. 2190-2193, doi: 10.1109/ICCSP.2016.7754571. (Year: 2016).*

P. Mittra and N. Rakesh, "A desktop application of QR code for data security and authentication," 2016 International Conference on Inventive Computation Technologies (ICICT), 2016, pp. 1-5, doi: 10.1109/Inventive.2016.7824809. (Year: 2016).*

* cited by examiner

DYNAMIC SCAN CODE GENERATION

BACKGROUND

Many entities, such as businesses, spend substantial amounts of computing resources and network bandwidth for generating information such as promotions that are provided to users. In an example, a clothing business may generate and send emails to users that have subscribed to newsletters from the clothing business. In another example, an electronics store may generate and send emails of promotions to users that have previously purchased items from the electronics store. In another example, a concert venue may send upcoming concert notifications to users that have previously purchased tickets for the concert venue. Because such entities spend significant amounts of time, computing resources, and network bandwidth for communicating with users, the entities may desire to tailor their communication efforts towards users that have an interest in consumer goods, events, and services provided by such entities.

Unfortunately, an entity may be unable to track whether users follow through with information provided by the entity, and thus the entity may be unable to understand whether such information was relevant and/or useful for users. For example, the clothing business may send emails with a tee shirt coupon to users. If a user visits a shopping mall and purchases the tee shirt based upon having received the tee shirt coupon, the clothing business may be unable to determine that the specific user purchased the tee shirt in response to receiving the email with the tee shirt coupon. Because the clothing business cannot distinguish between what users find information from the clothing business relevant, the clothing business wastes substantial amounts of time, computing resources, and network bandwidth distributing information that certain users find irrelevant. Also, such information may be wasted when users are unable to adequately store the information for later retrieval at an appropriate time (e.g., when a user visits the electronics store, the user may be unable to locate an email from the electronics store with a coupon).

SUMMARY

In accordance with the present disclosure, one or more computing devices and/or methods for dynamic scan code generation are provided. In an example, a message, sent to a user from an entity, may be identified. For example, a shoe manufacturer may send an informational email to the user regarding a 10% deal on running shoes. An email application may identify the email for further processing. A meta tag (e.g., information within a header, a subject line, a body, an attachment, or any other part of the email) may be extracted from the message. The meta tag may comprise a user identifier of the user (e.g., an email address, a name, or any other unique identifier that can be used by the shoe manufacturer to recognize the user) and/or a promotion code for a consumer good (e.g., a 10% coupon for running shoes). The consumer good may correspond to a product, a service, an event, etc. The meta tag may be stored within a data structure (e.g., within a data structure such as a file or database maintained by the email application, within a coupon storage app, etc.).

A current location of a computing device, associated with the user, may be determined as being within a threshold distance of a consumer good location that sells the consumer good (e.g., the user may be driving near a department store that sells running shoes). Accordingly, a scan code (e.g., a bar code, a matrix bar code, an image, a QR code, a phrase, text, etc.) may be dynamically generated based upon the user identifier and/or the promotion code. For example, the user identifier and/or the promotion code (e.g., textual data) may be used as input into a scan code generator for dynamically generating the scan code. The scan code is dynamically generated in response to determining that locational information of the computing device (e.g., global positioning coordinate (GPS) data) is within the threshold distance of the consumer good location (e.g., within 1.5 miles from the department store). In an example, when the computing device comes within the threshold distance of the consumer good location, a notification of the scan code, the promotion code, the consumer good location, directions to the consumer good location, hours of operation, and/or other information may be provided to the user, such as through a push notification or other alert/message (e.g., a text message, an email, a social network post, etc.) through the computing device.

The scan code may be displayed through the computing device for applying the promotion code to a purchase from the consumer good location for the consumer good. For example, the department store may be able to scan the scan code from the computing device in order to redeem the 10% coupon for running shoes. In an example, payment information (e.g., bank account information, credit card information, online payment login credentials) may be encoded within the scan code so that the scan code itself can be used for completing payment for the purchase, thus enabling use of the promotion code and payment through a single action of scanning the scan code. The redemption of the scan code and the user identifier may be tracked and provided back to the shoe manufacturer because the user identifier and the promotion code were used to generate the scan code (e.g., encoded into the generation of the scan code, and thus can be extracted back from the scan code). In this way, the shoe manufacturer can track which users utilize the promotion code, such as through in-store redemption, which could otherwise not be tracked.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
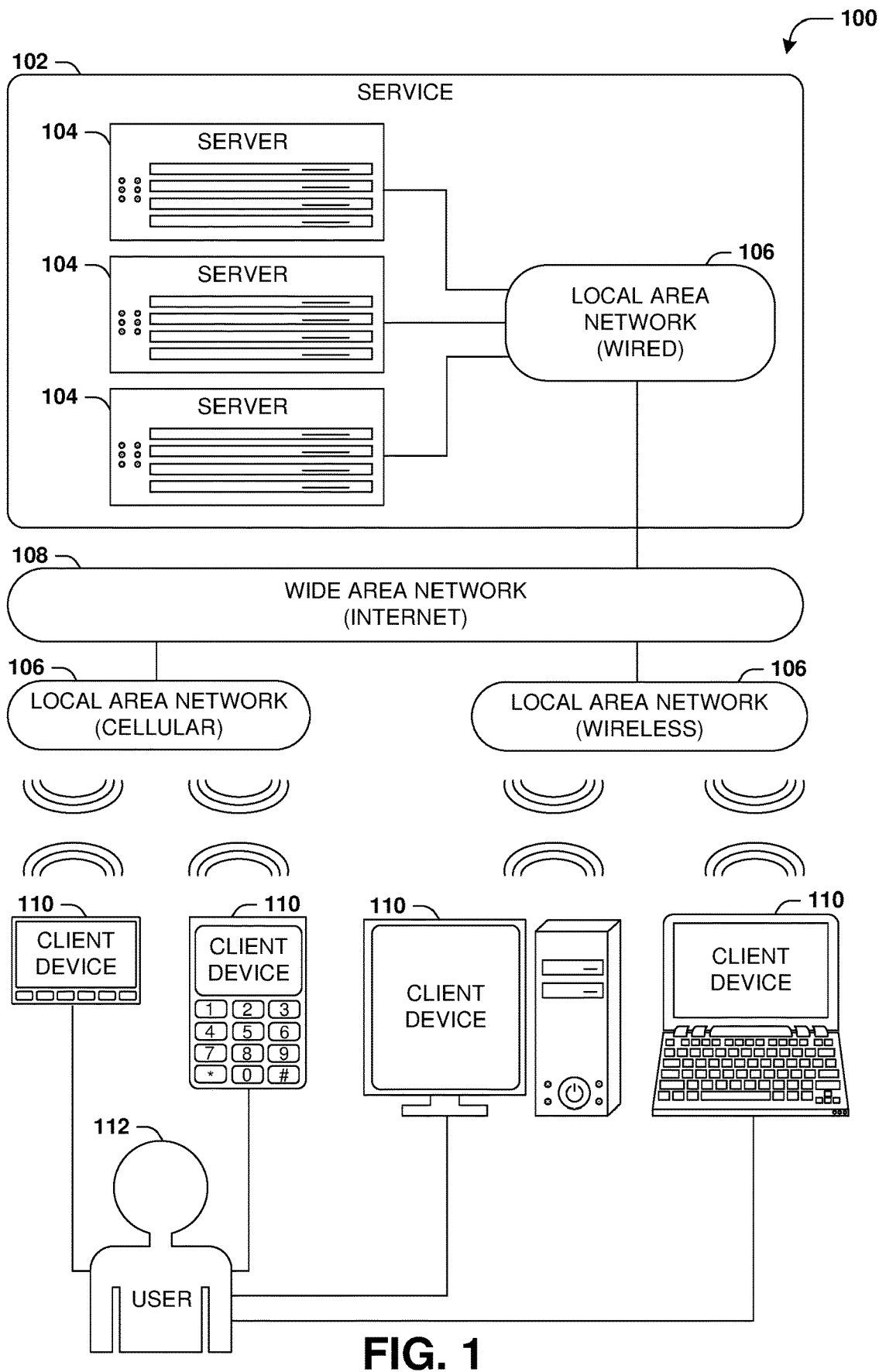
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
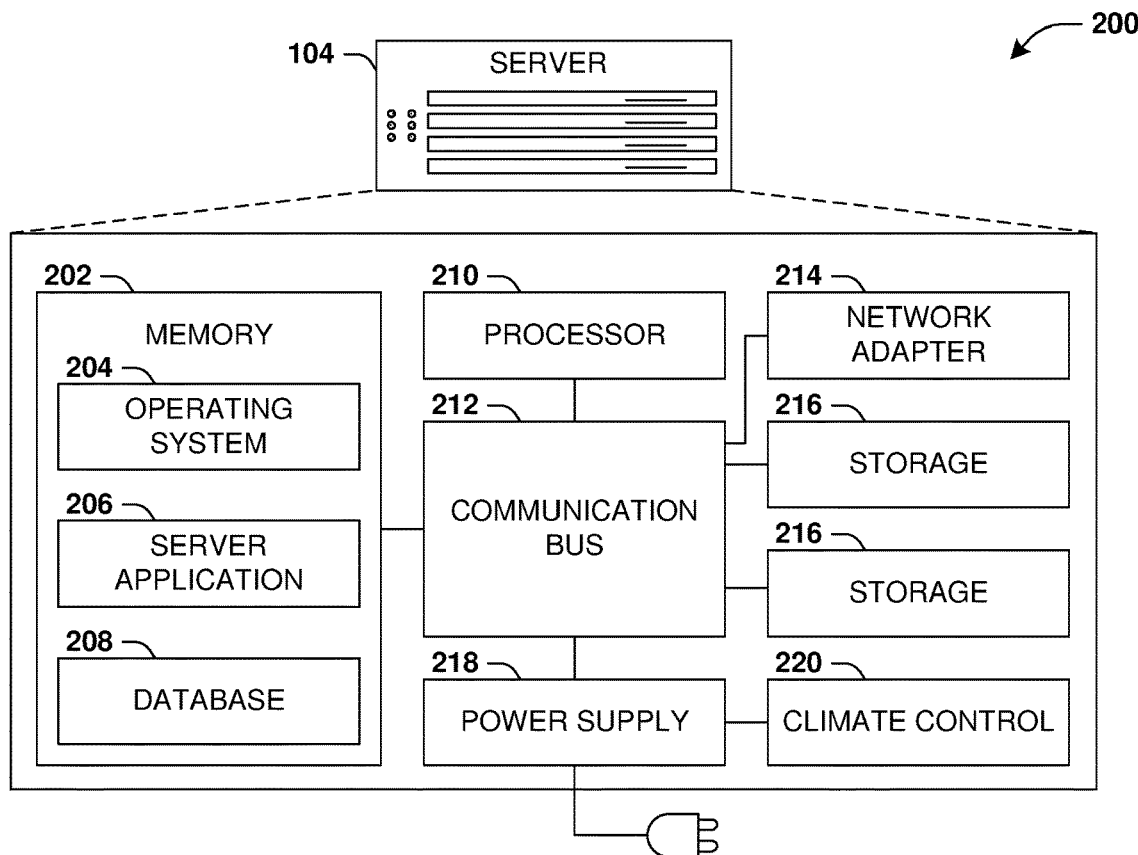
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
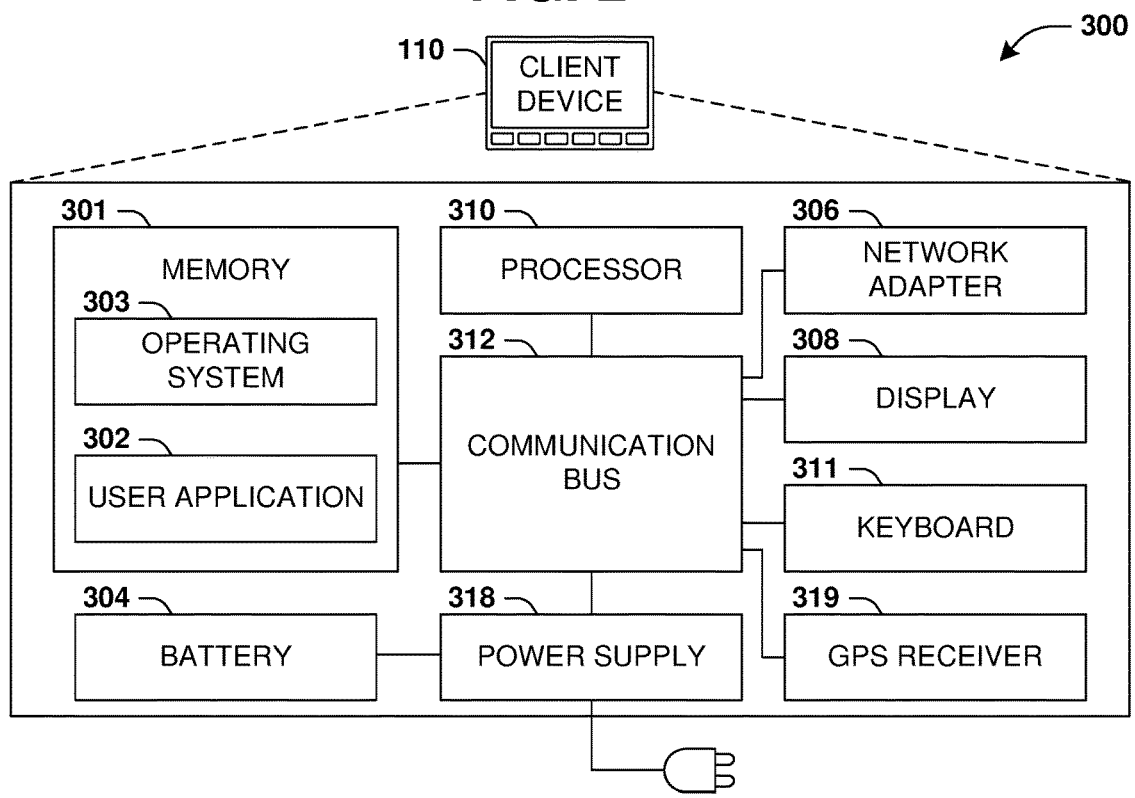
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for dynamic scan code generation are provided. For example, entities, such as businesses, may spend substantial amounts of time, computing resources, and/or network bandwidth when generating and sending information to computing devices of users (e.g., a promotional email campaign may expend server resources and network resources in creating, storing, and sending promotional emails to users). If an entity cannot track whether users are receptive to such information, then the entity may be wasting time, computing resources, and/or network bandwidth by sending information that is not relevant and/or interesting to certain users. These resources are also wasted if the information is forgotten or a user is unable to easily store and retrieve the information for later use at an appropriate time (e.g., when the user enters a store, the user may be unable to location an email coupon).

Accordingly, as provided herein, a scan code may be dynamically generated based upon a user identifier of a user and a promotion code for a consumer good. The scan code may be generated when a message with a meta tag, comprising the user identifier and the promotion code, is received. When a computing device associated with the user (e.g., a mobile device, a smart device, a wearable device, smart glasses, a tablet, a smart watch, an augmented reality device, etc.) comes within a threshold distance of a consumer good location that sells the consumer good, the scan code may be automatically generated and provided to the user, such as through a push notification through the computing device. In this way, the user is automatically provided with notice of the promotion code at an appropriate and convenient time without having to spend substantial amounts of time, computing resources, and/or network bandwidth attempting to locate and retrieve the promotion code.

When the scan code is used to make a purchase of the consumer good, the user identifier and the promotion code may be recorded (e.g., extracted from the scan code) to track that the user purchased the consumer good based upon the promotion code. In this way, the entity may track what users are interested with certain types of information so that the entity can avoid wasting time, computing resources, and/or bandwidth in generating and sending information to other users that may not find such information relevant and/or interesting.

Figure 4:
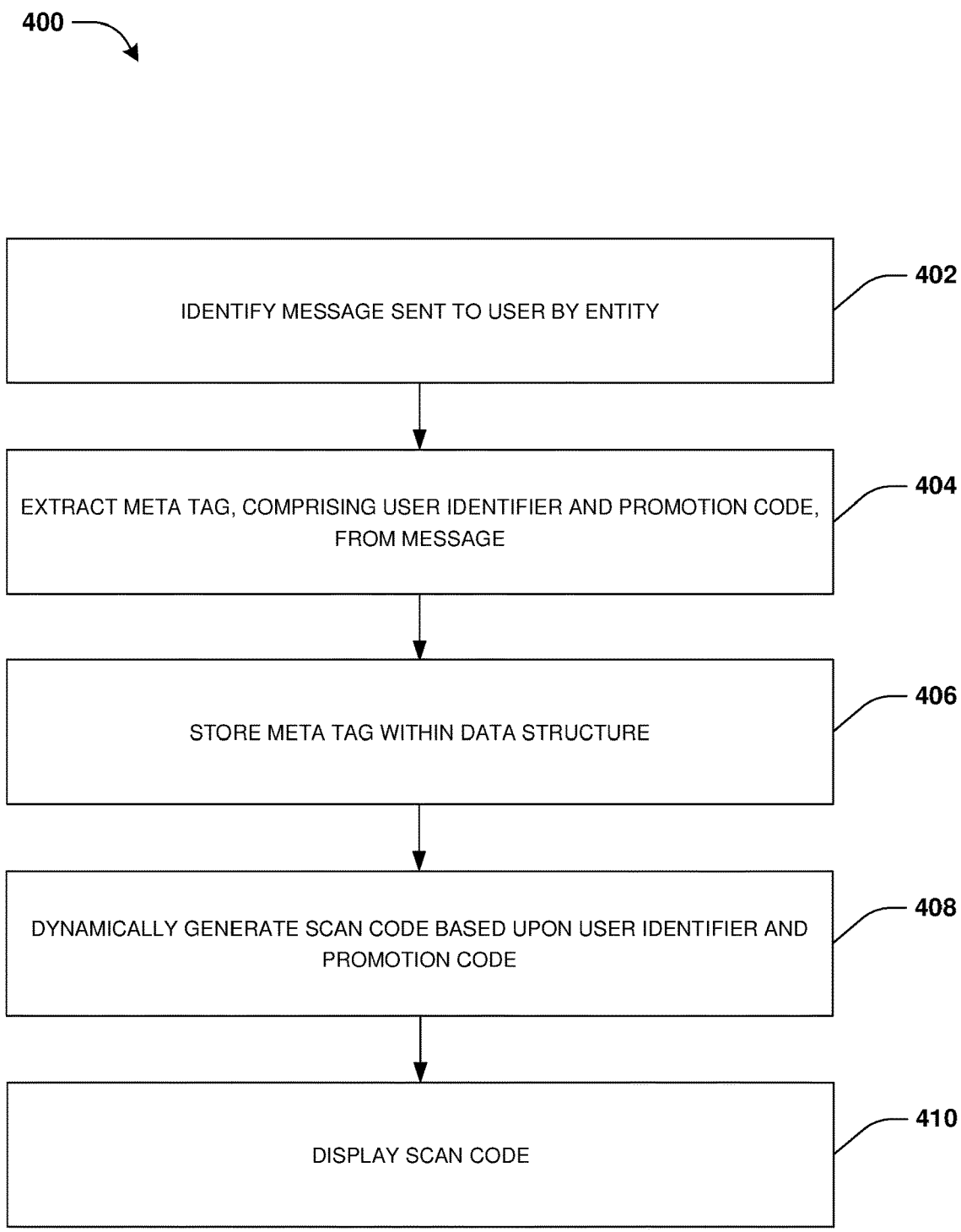
FIG. 4 is a flow chart illustrating an example method for dynamic scan code generation.

An embodiment of dynamic scan code generation is illustrated by an example method 400 of FIG. 4. At 402, a message sent to a user from an entity may be identified. For example, a car wash retailer may send an email to the user with a $5 off coupon. The car wash retailer may have embedded a meta tag within the email (e.g., text, metadata, or any other information included within the email, such as within a header, a body, a subject, etc.). The meta tag may be an indicator that the car wash retailer wants to track whether the user redeems the $5 off coupon. At 404, the meta tag is extracted from the message. The meta tag may comprise a user identifier of the user (e.g., an identifier that can be used by the car wash retailer for identifying the user) and a promotion code for a consumer good (e.g., the $5 off coupon for a car wash service). At 406, the meta tag may be stored within a data structure (e.g., within a file or database of a message interface or service that received the email; within a file of a computing device associated with the user; within a coupon tracking app; etc.).

Locational information of the computing device of the user (e.g., global positioning system (GPS) data of a phone, a watch, a smart device, glasses, a wearable device, etc.) may be tracked to determine whether the user is within a threshold distance of a consumer good location that sells the consumer good (e.g., a car wash plaza, franchised from the car wash retailer, that is maintained by a gas station). Responsive to determining that a current location of the computing device is within the threshold distance of the consumer good location, a scan code may be dynamically generated, at 408. The dynamic generation of the scan code may be triggered based upon the current location being within the threshold distance of the consumer good location (e.g., triggered based upon the user being within 1 mile of the gas station). A scan code generator may use the user identifier and/or the promotion code to as inputs for generating the scan code. In an example, payment information of the user (e.g., credit card information, bank account information, online payment service information, etc.) may be encoded into the scan code so that the scan code can be used to apply payment for a purchase.

In an example, a notification of the promotion code may be displayed such as through a push notification based upon the current location being within the threshold distance of the consumer good location. The notification may describe the consumer good location and directions from the current location to the consumer good location. The notification may provide an hours of operation and/or other information relating to the consumer good location (e.g., additional promotions for gas station and/or the car wash plaza, car wash pricing data, user reviews and recommendations, a link to a social network profile of the car wash retailer, etc.). In an example, the notification may be displayed through an augmented reality experience provided by the computing device (e.g., smart glasses). For example, the promotion code of $5 off a car wash may be displayed, through the augmented reality experience, with an arrow pointing towards the car wash plaza and/or along with any other information.

At 410, the scan code may be displayed through the computing device for applying the promotion code to a purchase from the consumer good location for the consumer good, such as the $5 off coupon for a car wash. For example, the car wash plaza may be able to scan the scan code in order to provide the user with a $5 discount.

The use of the scan code may be tracked so that the entity can determine whether the user utilized the promotion code or not. Various techniques may be used to determine that the scan code was used to redeem the promotion code. In an example, a sensor of the computing device (e.g., a camera) may be used to determine that a scanner scanned the scan code. In another example, a message data structure, indicative of redemption of the promotion code and the user identifier, may be received from a remote computing device associated with a vendor of the consumer good location (e.g., a computer of the gas station may generate and send a message to promotion tracking functionality or another device). In this way, a tracking data structure, comprising the promotion code and the user identifier, may be generated (e.g., based upon receipt of the message) to indicate that the user redeemed the promotion code. In an example, a location identifier, of the consumer good location, may be included within the tracking data structure. The tracking data structure may be sent to a remote computing device of the entity for tracking use of the promotion code.

In an example, the promotion code may be shared with other users. For example, a second user having an association with the user may be identified (e.g., a social network friend, a contact within a contact list, etc.). Scan code instructions, for generating a second scan code with a second user identifier of the second user and the promotion code, may be generated. The scan code instructions may be sent to a second computing device of the second user for generating and providing the second scan code through the second computing device to the second user for redeeming the promotion code.

In other embodiments of dynamic scan code generation, a user of a computing device may be determined as having an associated with a consumer good (e.g., a fancy coffee drink from a coffee retailer) and that there is a promotion code available for the consumer good (e.g., the coffee retailer may provide an indication that there is a 10% sale on the fancy coffee drink). In one example of determining the association with the consumer good, a coupon database of coupons associated with the user may be evaluated to determine that the coupon database has a coupon for the consumer good (e.g., a 10% sale coupon may have been stored within the coupon database by the user). In another example, a user profile (e.g., a social network profile, a profile maintained with a service or application, etc.) may be evaluated to determine that the user has an interest in the fancy coffee drink (e.g., the user may post through a social network about how delicious is the fancy coffee drink). In another example, a subscription to the entity may be identified to determine that the user is associated with the consumer good. In this way, various information and user signals (e.g., email information, calendar data, location check-in information, etc.) may be used to determine that the user has an interest in the entity and/or the consumer good.

When a current location of the computing device is a threshold distance from a consumer good location that sells the consumer good, a scan code may be dynamically generated based upon a user identifier of the user and the promotion code. The scan code may be displayed through the computing device for applying the promotion code to a purchase from the consumer good location for the consumer good.

Figure 5A:
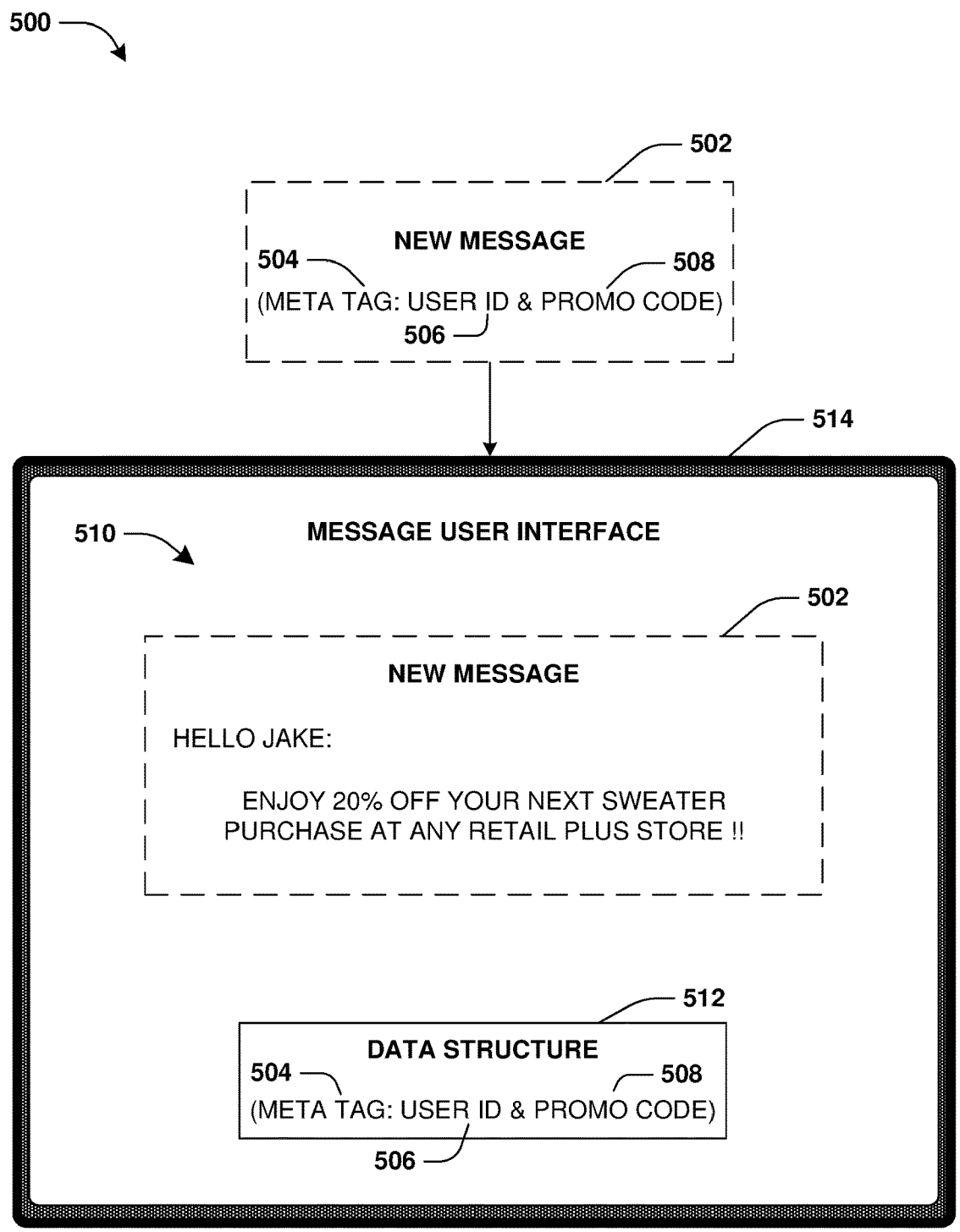
FIG. 5A is a component block diagram illustrating an example system for dynamic scan code generation, where a meta tag is extracted from a new message.
Figure 5B:
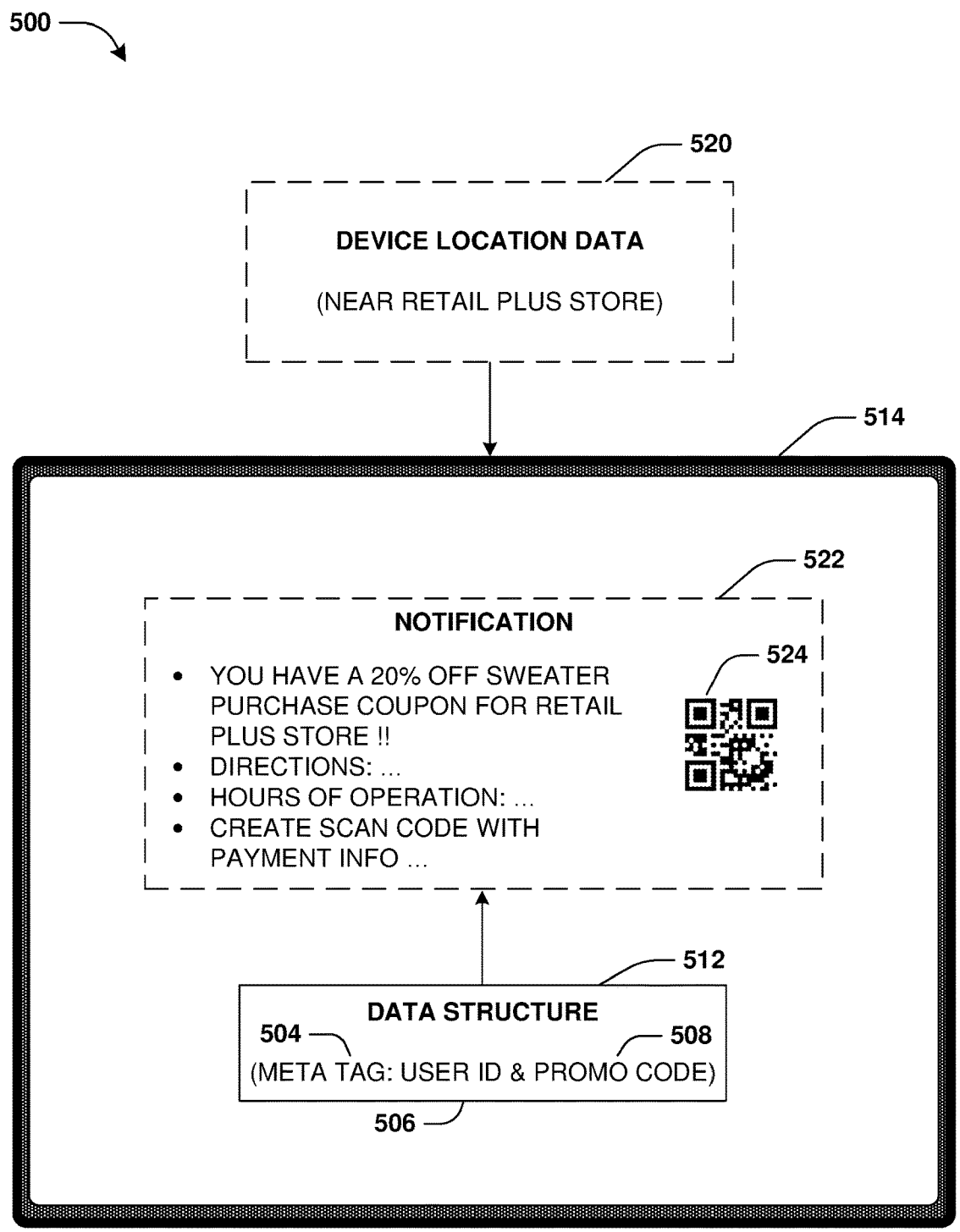
FIG. 5B is a component block diagram illustrating an example system for dynamic scan code generation, where a scan code is generated based upon a meta tag.

FIGS. 5A-5B illustrate examples of a system 500 for dynamic scan code generation. FIG. 5A illustrates a user accessing a message user interface 510 through a computing device 514. The message user interface 510 may display a new message 502 received from an entity, such as from a Retail Plus Store. The new message 502 may comprise a meta tag 504. The meta tag 504 may comprise a user identifier 506 of the user (e.g., Jake's full name, an email address of Jake, a numeric code, an alphanumeric code, etc.). The meta tag 504 may comprise a promotion code 508, such as a 20% coupon for a sweater purchase at any Retail Plus Store. The meta tag 504 may be stored within a data structure 512 (e.g., a file within the computing device 514, application data of the message user interface 510, application data of a coupon tracking app, etc.).

FIG. 5B illustrates device location data 520, such as GPS data, of the computing device 514 being tracked. For example, the device location data 520 may indicate that the computing device 514 is within a threshold distance of a consumer good location that sells the consumer good (e.g., within a 2 miles from a Retail Plus Store that sells the sweater). Accordingly, the data structure 512 may be identified. The meta tag 504 may be extracted from the data structure 512. The user identifier 506 and the promotion code 508 of the meta tag 504 may be used to dynamically generate a scan code 524 that can be used to apply the promotion code 508 to a purchase of the consumer good, such as to redeem the 20% off coupon for the sweater.

In an example, a notification 522, such as a push notification, may be provided through the computing device 514. The notification 522 may provide details for the promotion code of the 20% off coupon for the sweater. The notification 522 may provide directions from the current location of the computing device 514 to the Retail Plus Store. The notification 522 may provide hours of operation for the Retail Plus Store. The notification 522 may provide the option for payment information to be incorporated into the scan code 524. In this way, the user may utilize the scan code 524 to redeem the 20% off coupon for the sweater. The use of the promotion code 508 by this particular user may be tracked based upon scanned information from the scan code 524 (e.g., the user identifier 506 and/or the promotion code 508 may be extracted from the scan code 524). For example, the user identifier 506 and/or the promotion code 508 may be extracted during scanning of the scan code 524 so that the user can be identified as having redeemed the 20% off coupon for the sweater. Other indications, such as sensor information from a sensor of the computing device 514 (e.g., a camera), may be used to determine that the scan code 524 was used. In this way, the Retail Plus Store can track that the user redeemed the 20% off coupon for the sweater.

Figure 6:
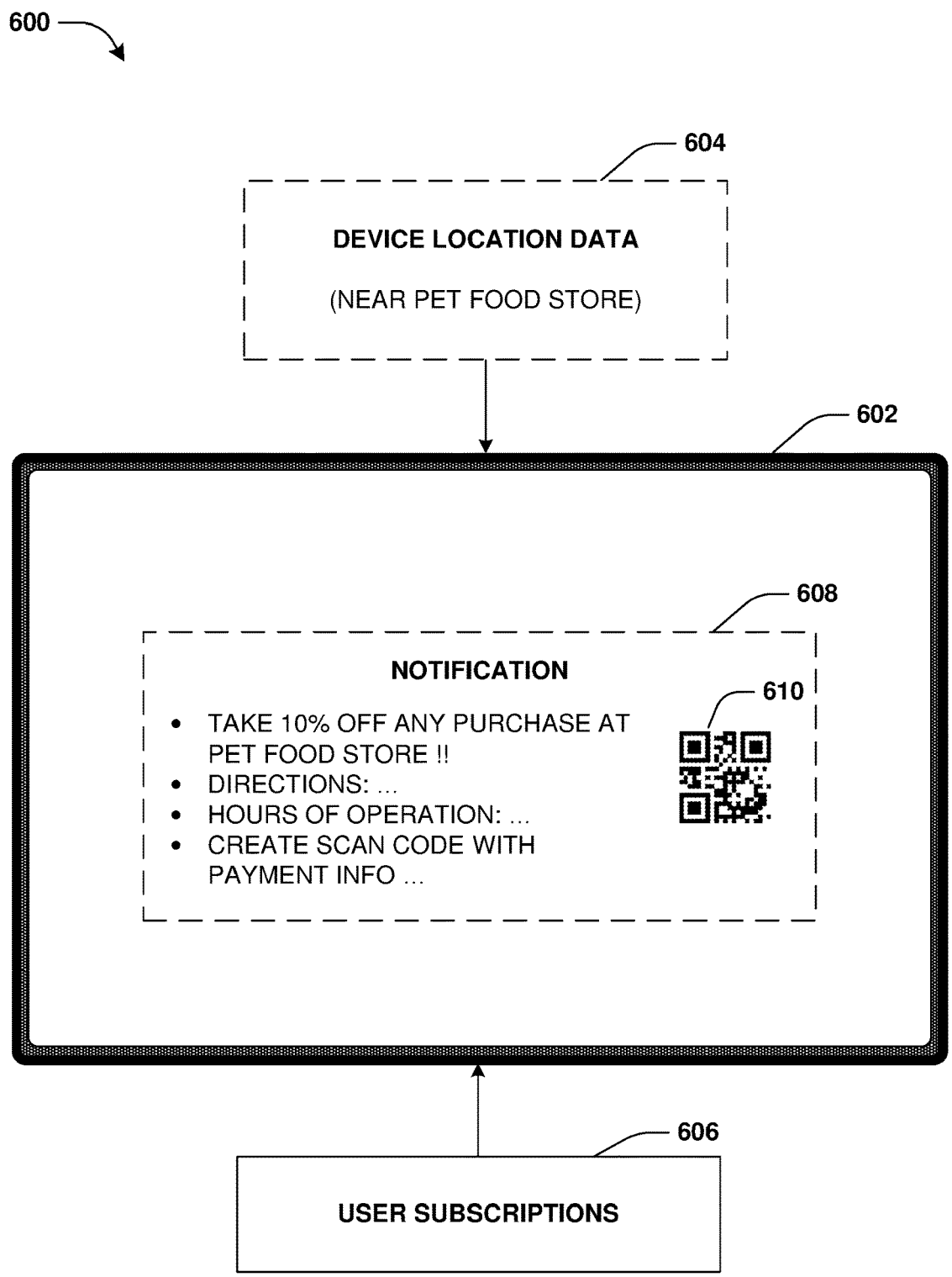
FIG. 6 is a component block diagram illustrating an example system for dynamic scan code generation, where a scan code is generated based upon a user subscription.

FIG. 6 illustrates an example of a system 600 for dynamic scan code generation. For example, user subscriptions 606 of a user of a computing device 602 may be evaluated to determine that the user has a subscription (e.g., a newsletter subscription) to a Pet Food Store. Accordingly, available coupon data for the Pet Food Store may be identified (e.g., a coupon service or website may specify a coupon, a coupon may reside within an email of the user's email account, a coupon may be posted by a social network profile of the Pet Food Store, etc.).

Device location data 604 of the computing device 602 may be tracked for determining when to notify the user of any available promotions/coupons. Responsive to a current location of the computing device 602 being within a threshold distance of the Pet Food Store (e.g., within a 1 mile radius), a promotion code (e.g., a 10% off coupon from the Pet Food Store) and/or a user identifier (e.g., an email address or any other identification information for the user) may be used to dynamically generate a scan code 610 that can be used to apply the 10% off coupon.

In an example, a notification 608, such as a push notification, may be provided through the computing device 602. The notification 608 may provide details of the 10% off coupon. The notification 608 may provide directions from the current location of the computing device 602 to the Pet Food Store. The notification 608 may provide hours of operation for the Pet Food Store. The notification 608 may provide the option for payment information to be incorporated into the scan code 610. In this way, the user may utilize the scan code 610 to redeem the 10% off coupon. The use of the 10% off coupon by this particular user may be tracked based upon scanned information from the scan code 610. For example, the user identifier and/or the 10% off coupon may be extracted during scanning of the scan code 610 so that the user can be identified as having redeemed the 10% off coupon. Other indications, such as sensor information from a sensor of the computing device 602 (e.g., a camera), may be used to determine that the scan code 610 was used. In this way, the Pet Food Store can track that the user redeemed the 10% off coupon.

Figure 7:
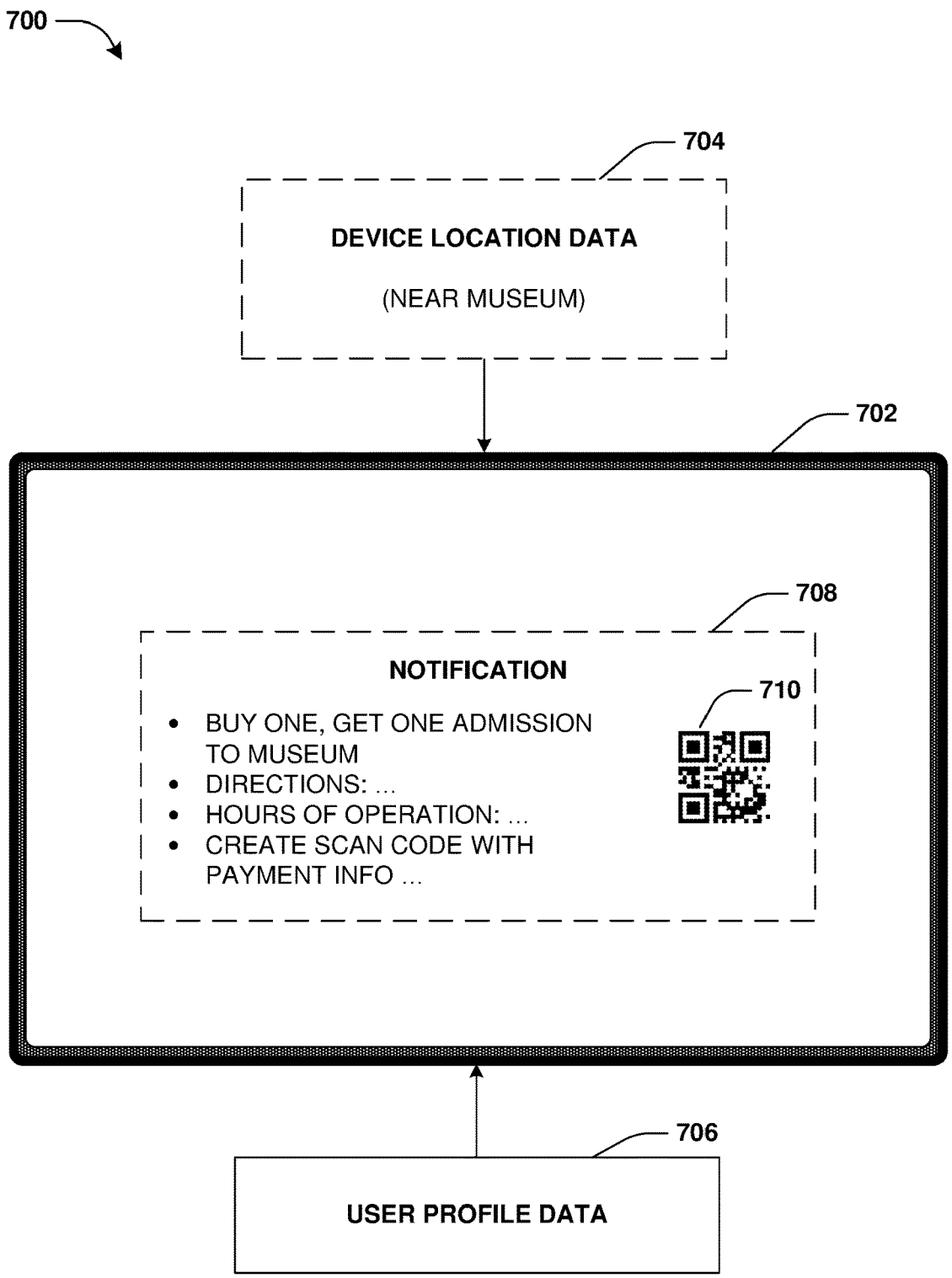
FIG. 7 is a component block diagram illustrating an example system for dynamic scan code generation, where a scan code is generated based upon user profile data.

FIG. 7 illustrates an example of a system 700 for dynamic scan code generation. For example, user profile data 706 of a user of a computing device 702 may be evaluated to determine that the user has an interest in a consumer good or an entity that sells the consumer good (e.g., the user may routinely visit a Museum, which may be determined from social network check-in data at the Museum). Accordingly, a promotion code for the Museum may be identified (e.g., a buy one get one free admission promotion identified from a social network post by the Museum).

Device location data 704 of the computing device 702 may be tracked for determining when to notify the user of any available promotions/coupons. Responsive to a current location of the computing device 702 being within a threshold distance of the Museum (e.g., within a 6 mile radius), a promotion code and/or a user identifier (e.g., an email address or any other identification information for the user) may be used to dynamically generate a scan code 710 that can be used to redeem the buy one get one free admission promotion.

In an example, a notification 708, such as a push notification, may be provided through the computing device 702. The notification 708 may provide details of the buy one get one free admission promotion. The notification 708 may provide directions from the current location of the computing device 702 to the Museum. The notification 708 may provide hours of operation for the Museum. The notification 708 may provide the option for payment information to be incorporated into the scan code 710. In this way, the user may utilize the scan code 710 to redeem the buy one get one free admission promotion. The use of the buy one get one free admission promotion by this particular user may be tracked based upon scanned information from the scan code 710. For example, the user identifier and/or the buy one get one free admission promotion may be extracted during scanning of the scan code 710 so that the user can be identified as having redeemed the buy one get one free admission promotion. Other indications, such as sensor information from a sensor of the computing device 702 (e.g., a camera), may be used to determine that the scan code 710 was used. In this way, the Museum can track that the user redeemed the buy one get one free admission promotion.

Figure 8:
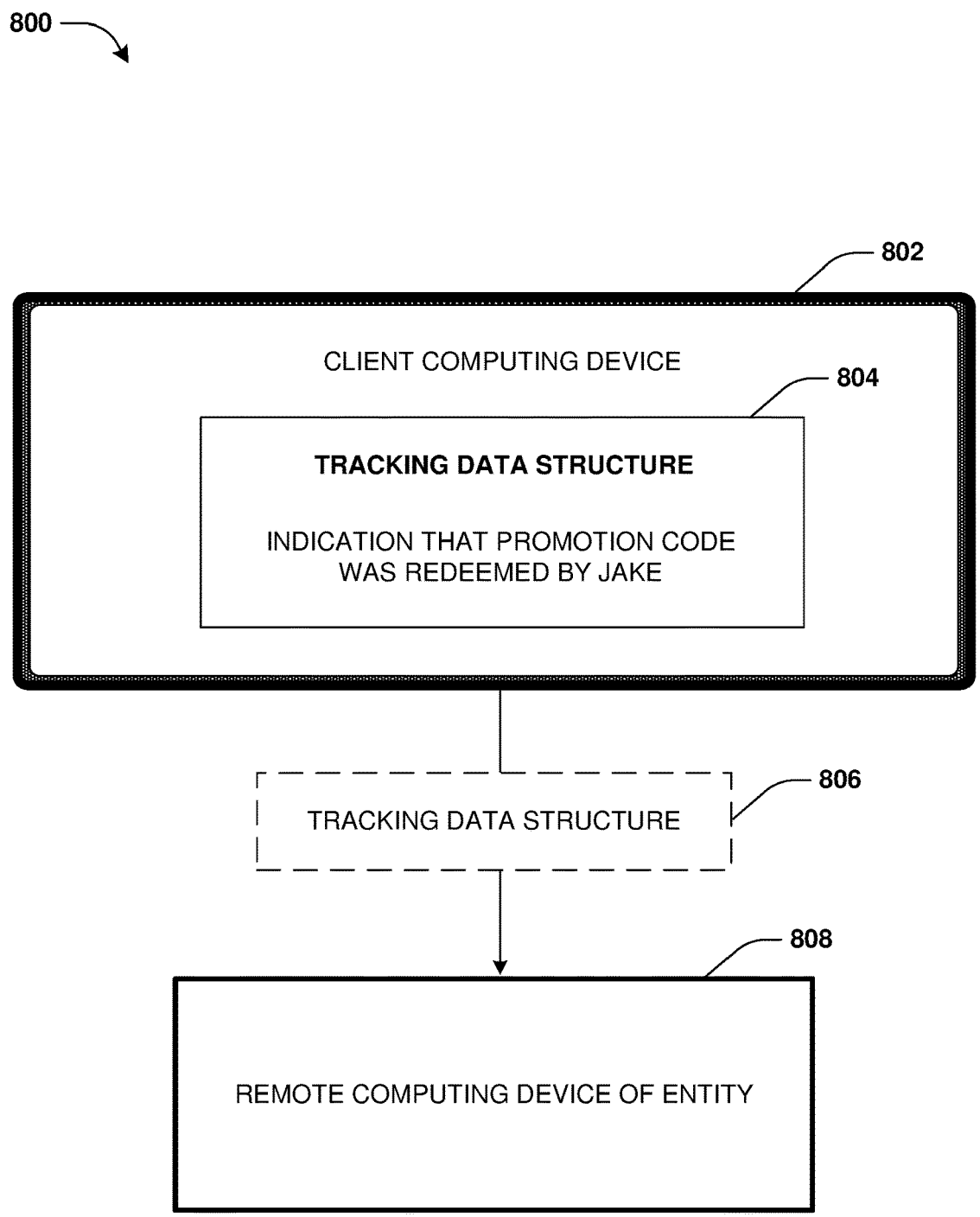
FIG. 8 is a component block diagram illustrating an example system for dynamic scan code generation, where a tracking data structure is sent to a remote computing device of an entity.

FIG. 8 illustrates an example of a client computing device 802 providing 806 a tracking data structure 804 to a remote computing device 808 of an entity. For example, a user Jake of the client computing device 802 may have used a dynamically generated scan code to redeem a promotion code used to purchase a consumer good of the entity (e.g., Jake bought dog food at a grocery store using a 10% promotion code from a Dog Food Company). In response to the scan code being redeemed, a tracking data structure 804 may be generated. The tracking data structure 804 may comprise a user identifier of user Jake and/or the promotion code. In this way, the tracking data structure 804 may be provided 806 to the remote computing device 808 of the Dog Food Company so that the Dog Food Company can track the fact that user Jack redeemed the promotion code at the grocery store for purchasing dog food.

Figure 9:
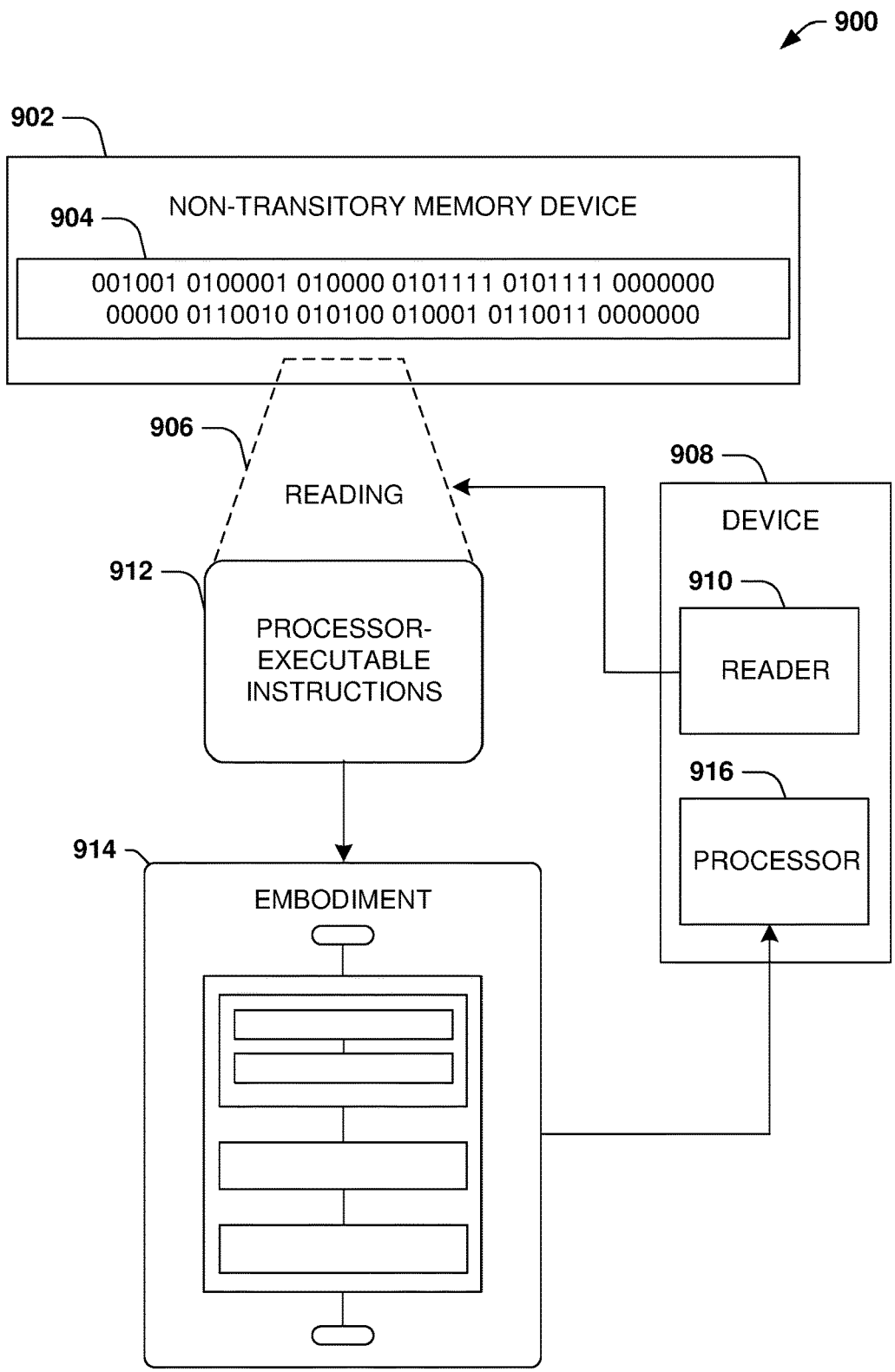
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 500 of FIGS. 5A-5B, at least some of the example system 600 of FIG. 6, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of dynamic scan code generation, the method comprising:
    executing, on a processor of a computing device, instructions that cause the computing device to perform operations, the operations comprising:
        identifying a message sent to a user from an entity;
        extracting a meta tag, comprising a user identifier of the user and a promotion code for a consumer good, from the message;
        storing the meta tag within a data structure;
        responsive to determining that a current location of a computing device, associated the user, is within a threshold distance of a consumer good location that sells the consumer good:
            dynamically generating a scan code based upon (i) the user identifier, of the user, extracted from the message and stored as part of the meta tag within the data structure and (ii) the promotion code, of the user, extracted from the message and stored as part of the meta tag within the data structure by encoding the user identifier and the promotion code into the scan code; and
            displaying, through the computing device, a notification concurrently comprising:
                (i) the scan code; and
                (ii) an option for incorporating online payment login credentials into the scan code to generate a single updated scan code encoding both the promotion code and the online payment login credentials; and
            responsive to receiving a selection of the option for incorporating the online payment login credentials into the scan code:
                incorporating the online payment login credentials into the scan code to generate the single updated scan code encoding both the promotion code and the online payment login credentials; and
                displaying the single updated scan code through the computing device, wherein the single updated scan code enables, through a single action of scanning, both application of the promotion code for a purchase of the consumer good and completion of payment for the purchase of the consumer good.

2. The method of claim 1, comprising:
    determining that the scan code was used to redeem the promotion code.

3. The method of claim 1, comprising:
    responsive to determining that the current location is within the threshold distance of the consumer good location, displaying a notification of the consumer good location with directions from the current location to the consumer good location and an hours of operation for the consumer good location.

4. The method of claim 1, wherein the online payment login credentials are different than credit card information.

5. The method of claim 2, comprising:
    generating a tracking data structure, comprising the promotion code and the user identifier, to indicate that the user redeemed the promotion code.

6. The method of claim 5, wherein the generating a tracking data structure comprises:
    including a location identifier, of the consumer good location, within the tracking data structure.

7. The method of claim 5, comprising:
    sending the tracking data structure to a remote computing device of the entity.

8. The method of claim 5, wherein the determining that the scan code was used comprises:
    utilizing a sensor of the computing device to determine that a scanner scanned the scan code.

9. The method of claim 5, wherein the determining that the scan code was used comprises:
    receiving a message data structure, indicative of redemption of the promotion code and the user identifier, from a remote computing device associated with a vendor of the consumer good location.

10. A computing device comprising:
    a processor; and
    memory comprising processor-executable instructions that when executed by the processor cause performance of operations, the operations comprising:
        responsive to determining that a user of the computing device has an association with a consumer good and that there is a promotion code available for the consumer good, determining that a current location of the computing device is within a threshold distance of a consumer good location that sells the consumer good;
        dynamically generating a scan code based upon a user identifier of the user and the promotion code by encoding the user identifier and the promotion code into the scan code;
        displaying, through the computing device, a notification comprising:
            an option for incorporating payment information into the scan code to generate a single updated scan code encoding both the promotion code and the payment information; and
        responsive to receiving a selection of the option for incorporating the payment information into the scan code:

incorporating the payment information into the scan code to generate the single updated scan code encoding both the promotion code and the payment information; and displaying the single updated scan code through the computing device, wherein the single updated scan code enables, through a single action of scanning, both application of the promotion code for a purchase of the consumer good and completion of payment for the purchase of the consumer good.

11. The computing device of claim 10, wherein the operations comprise:

evaluating a coupon database of coupons associated with the user to determine that the user is associated with the consumer good based upon the coupon database comprising a coupon for the consumer good.

12. The computing device of claim 10, wherein the operations comprise:

evaluating a social network profile of the user to determine that the user is associated with the consumer good based upon a social network post associated with the social network profile indicating that the user has an interest in the consumer good.

13. The computing device of claim 10, wherein the operations comprise:

determining that the user is associated with the consumer good based upon the user having a newsletter subscription to an entity.

14. The computing device of claim 10, wherein the operations comprise:

identifying a second user having an association with the user;

generating scan code instructions for generating a second scan code with a second user identifier of the second user and the promotion code; and sending the scan code instructions to a second computing device of the second user for generating and providing the second scan code through the second computing device to the second user.

15. The computing device of claim 10, wherein the operations comprise:

evaluating a calendar of the user to determine that the user is associated with the consumer good.

16. The computing device of claim 10, wherein the operations comprise:

evaluating location check-in information of the user to determine that the user is associated with the consumer good.

17. A non-transitory machine readable medium having stored thereon processor-executable instructions that when executed cause performance of operations, the operations comprising:

evaluating a data structure to identify a meta tag comprising a user identifier of a user and a promotion code for a consumer good; and responsive to determining that a current location of a computing device, associated the user, is within a threshold distance of a consumer good location that sells the consumer good:

dynamically generating a scan code based upon the user identifier and the promotion code from the meta tag by encoding the user identifier and the promotion code into the scan code; and displaying, through the computing device, a notification concurrently comprising:

(i) the scan code; and (ii) an option for incorporating payment information into the scan code to generate a single updated scan code encoding both the promotion code and the payment information, wherein the single updated scan code enables, through a single action of scanning, both application of the promotion code for a purchase of the consumer good and completion of payment for the purchase of the consumer good.

18. The non-transitory machine readable medium of claim 17, wherein the operations comprise:

determining that the scan code was used to redeem the promotion code; and generating a tracking data structure, comprising the promotion code and the user identifier, to indicate that the user redeemed the promotion code.

19. The non-transitory machine readable medium of claim 18, wherein the operations comprise:

including a location identifier, of the consumer good location, within the tracking data structure.

20. The non-transitory machine readable medium of claim 18, wherein the operations comprise:

sending the tracking data structure to a remote computing device of an entity.

* * * * *